United States Patent [19]

Chane-Ching et al.

[11] Patent Number: 4,663,137
[45] Date of Patent: May 5, 1987

[54] PROCESS FOR PRODUCING CERIUM OXIDE PARTICULATES

[75] Inventors: Jean-Yves Chane-Ching; Jean-Yves Dumousseau, both of Paris, France

[73] Assignee: Rhone-Poulenc Specialties Chimiques, Courbevoie, France

[21] Appl. No.: 703,558

[22] Filed: Feb. 20, 1985

[30] Foreign Application Priority Data

Feb. 20, 1984 [FR] France ............................... 84 02506

[51] Int. Cl.$^4$ ............................................. C01F 17/00
[52] U.S. Cl. .................................... 423/263; 502/304; 502/439
[58] Field of Search .......................................... 423/263

[56] References Cited

U.S. PATENT DOCUMENTS 4,529,410  7/1985  Khaladji et al. .................... 423/263

FOREIGN PATENT DOCUMENTS 33843   8/1981  European Pat. Off. ............ 423/263
833525  5/1981  U.S.S.R. .............................. 423/263

Primary Examiner—H. T. Carter
Attorney, Agent, or Firm—Burns, Doane, Swecker & Mathis

[57] ABSTRACT

Morphologically improved cerium oxide particulates useful, e.g., as catalysts/catalyst supports, and having a B.E.T. specific surface of at least 85±5 m$^2$/g, measured at a temperature ranging from 350° C. to 450° C., are prepared by hydrolyzing an aqueous solution of a cerium (IV) salt in an acidic medium, filtering the precipitate of hydrolysis which results, washing and optionally drying said precipitate, and then calcining same.

17 Claims, 2 Drawing Figures

10 μm

1 μm

PROCESS FOR PRODUCING CERIUM OXIDE PARTICULATES

CROSS-REFERENCE TO RELATED APPLICATION

Our copending application, Ser. No. 703,474, filed concurrently herewith and assigned to the assignee hereof.

BACKGROUND OF THE INVENTION

1. Field of the Invention

The present invention relates to a novel ceric oxide having new and improved morphological properties. It also relates to the preparation of such novel ceric oxide.

In the description which follows, by the term "specific surface" there is intended the specific B.E.T. surface, determined in accordance with the BRUNAUER-EMMETT-TELLE method described in Journal of the American Chemical Society, 60, 309 (1938).

2. Description of the Prior Art

It is known to this art that ceric oxide, whether alone or in mixture with other metallic oxides, is useful as a catalyst for the synthesis, in particular, of methanol [C.R. Séances, Acad. Sci., Ser.2, 292 (12), 883–5 (1981)] or in methods for treating residual gases (published Japanese Patent Application No. 76/62,616).

In order to demonstrate good catalytic reactivity, it is desirable to use a ceric oxide which has the greatest possible specific surface.

To date, however, most methods for the preparation of ceric oxide do not enable the attainment of this result.

For example, a method of preparing cerium (IV) oxide by the thermal decomposition of cerium (III) oxalate is known, from the article by S. Horsley, J. M. Towner and M. B. Waldron [Preprints, Symp. Eur. Metall. Poudres, 4th, 1, paper 12 (1975)].

The subject treatment, carried out at 450° C., provides a ceric oxide having a specific surface of only 69 $m^2/g$.

Compare also R. Sh. Mikhail, R. M. Cagr and R. B. Fahin, J. Appln. Chem., 20, 7, 222–225 (1970) which features the structure of ceric oxide, and reports the characteristics of the ceric oxide prepared by the calcining of ceric hydroxide obtained by treatment of a solution of cerous nitrate with ammonia in the presence of hydrogen peroxide. It is noted, however, that the ceric oxide obtained by calcining at 400° C. has a specific surface of only 80 $m^2/g$.

SUMMARY OF THE INVENTION

Accordingly, a major object of the present invention is the provision of a novel ceric oxide having a specific surface greater than that hitherto known to this art, i.e., a specific surface of at least $85\pm5$ $m^2/g$ for a temperature of measurement ranging from 350° C. to 450° C.

DETAILED DESCRIPTION OF THE INVENTION

More particularly according to the present invention, the novel ceric oxide preferably has a maximum specific surface, namely, 100 to 130 $m^2/g$, for a temperature of measurement ranging from 400° C. to 450° C.

Another characteristic of the ceric oxide of the invention is that it exhibits only a slight change in specific surface when subjected to an increase in temperature.

Thus, it has a specific surface on the order of 90 $m^2/g$ for temperatures of use of 300° C. and 600° C. and a specific surface on the order of 120 $m^2/g$ at 400° C., and its specific surface decreases by at most about 30 $m^2/g$ when it is subjected to an increase in temperature from 400° C. to 600° C.

Finally, another characteristic of the ceric oxide of the invention is that it has a fine, narrow particle size distribution.

It has aggregate dimensions ranging from 0.2 to 2.0 μm. The method of particle size measurement is based on a variation in X-ray adsorption caused by the sedimentation of the particles by gravity.

Generally, the size of the aggregates expressed as the mean diameter ($d_{50}$) varies from 0.5 to 1.5 μm and preferably from 0.9 to 1.1 μm. The mean diameter is defined as being a diameter such that 50% by weight of the aggregates have a diameter greater or less than the mean diameter.

The standard deviations $e_1$ and $e_2$, which are defined by the ratios $d_{84}/d_{50}$ and $d_{50}/d_{16}$ are included within a range extending from 1.0 to 2.5.

Figure 1:
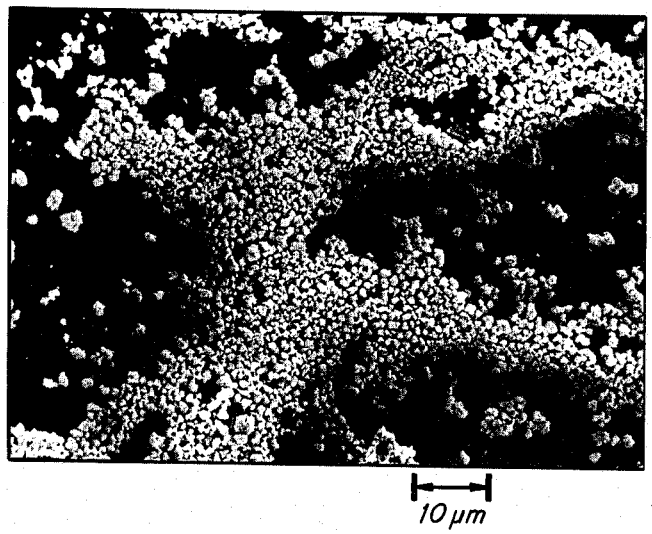
Figure 2:
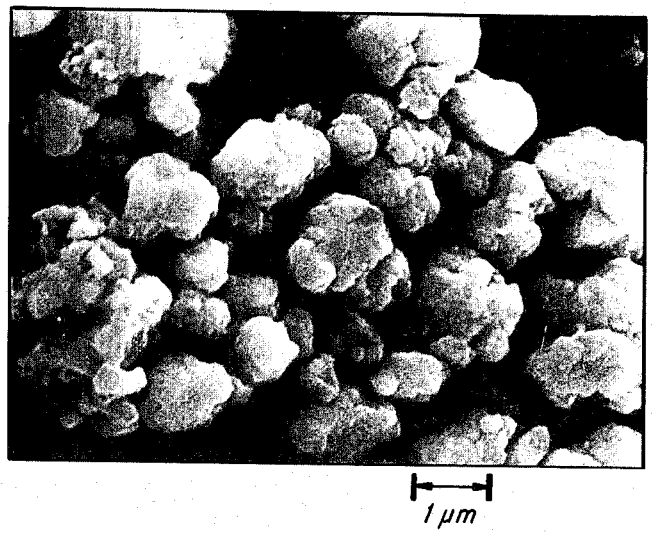

FIGS. 1 and 2 are photomicrographs taken with an electronic scanning microscope (enlargement: 1,200 and 12,000) which evidence the morphology of the spheroidal type of ceric oxide obtained in accordance with the invention. A uniform particle size distribution of the product obtained is also noted.

The invention also features a process for the preparation of the subject ceric oxide particulates having large specific surface, comprising hydrolyzing an aqueous solution of cerium (IV) salt in an acid medium, filtering the resultant precipitate, washing and optionally drying same, and then calcining said washed and optionally dried precipitate.

In the first step of the process of the invention, hydrated ceric oxide, $CeO_2 \cdot 2H_2O$, is prepared.

For this purpose one begins with a solution of cerium (IV) which may be an aqueous solution of ceric nitrate or an aqueous solution of ammonium ceric nitrate. Said solution may contain, without drawback, cerium in cerous state but it is desirable that it contain at least 85% of cerium (IV) in order to obtain a good yield of precipitation.

The cerium salt is selected in such manner that it does not contain impurities which could be transferred into the final product after calcining. It may be advantageous to use a cerium salt having a degree of purity of more than 99%.

The concentration of the solution of cerium salt is not a critical factor according to the invention. When it is expressed as cerium (IV), it may vary from 0.3 to 2 mols/liter.

The medium of hydrolysis consists of water which is preferably distilled water or water purified by ion exchange.

The hydrolysis is carried out in an acid medium. The acidity may be contributed by the commencement of the hydrolysis reaction, since the formation of one mole of hydrated ceric oxide is accompanied by the liberation of 4 protons.

The acidity may also be imparted by the addition of an inorganic acid thereto. Preferably nitric acid is selected. An acid which can be concentrated or dilute, for example, up to $10^{-2}$ N can be used.

The acidity may also emanate from the ceric nitrate solution, which may be slightly acid and have a normality varying from 0.3 N to 5 N and preferably from 0.3 N to 1 N.

The medium of hydrolysis advantageously has an acidity ranging from $10^{-2}$ N to 1.0 N.

The proportions between the aqueous solution of cerium (IV) salt and the medium of hydrolysis (essentially water) is such that the equivalent final concentration of cerium (IV) ranges from 0.2 to 0.8 mole/liter.

The equivalent final concentration of cerium (IV) is represented by the equation:

$$[Ce^{IV} \text{ equiv.}] = \frac{[Ce^{IV}] \times V'}{V + V'}$$

in which:
- $[Ce^{IV}]$ is the concentration in moles per liter of the solution of cerium (IV) salt;
- V is the volume of the water to which the acid has been added; and
- V' is the volume of the solution of cerium (IV).

The hydrolysis of the cerium (IV) salt, effected under those conditions above outlined, is preferably carried out at a temperature of from 70° C. up to the reflux temperature of the reaction medium, which is about 100° C.

It is easier to conduct the reaction at the reflux temperature as it is thus easy to control and reproduce.

In accordance with one first practical embodiment of the invention, the aqueous solution containing the acid is heated until the selected desired temperature is attained within a predetermined range.

The solution of cerium (IV) salt is then introduced either fractionally or continuously; the time of addition of the cerium (IV) salt solution typically ranges from 1 hour to 4 hours. Compare the examples to follow for specific illustration of suitable rates of addition of the cerium (IV) salt solution.

After completing the addition of said solution, the heating is continued until the cerium (IV) hydrate has completely precipitated. This time may vary over very wide limits of from 1 to 24 hours, but generally an additional 2 to 8 hours of heating is sufficient.

The second stage of the process of the invention consists of filtering, after reaction, the reaction mass which is present in the form of a suspension, the temperature of which ranges from 90° C. to 100° C. This operation is carried out either before or after the cooling of the reaction mass to room temperature, namely, to a temperature ranging from about 10° C. to 25° C.

In a preferred embodiment of the process of the invention, the filter cake is washed in order to eliminate the nitrate ions adsorbed on the precipitate.

The washing is carried out with an organic solvent. Exemplary such solvents are aliphatic, cycloaliphatic or aromatic hydrocarbons, or aliphatic or cycloaliphatic alcohols, such as methanol, ethanol, n-propanol, isopropanol, n-butanol, isobutanol, and neobutanol.

Most frequently, several such washings are carried out, e.g., from 1 to 3 washings.

After washing the water content of the filter cake ranges from 20% to 80% and typically from 20% to 50%.

The product obtained after filtration and washing is then dried in air or under a reduced pressure on the order of $10^{-2}$ to 100 mm mercury. The drying temperature advantageously varies from 90° C. to 200° C.; the drying time is not critical and may range from 10 to 48 hours.

In the final step of the process of the invention, the dried product is calcined at a temperature which is preferably selected as the average temperature of intended use of the ceric oxide as catalyst.

The calcining temperature advantageously ranges from 300° C. to 600° C. and preferably from 350° C. to 450° C. The time of calcination typically ranges from about 30 minutes to ten hours.

The lower limit of the temperature range is not critical and may be lowered.

On the other hand, there is no advantage in increasing the upper limit of the calcining temperature, since a decrease in the specific surface of the product ceric oxide is noted. Furthermore, it is pointed out that the product ceric oxide has a maximum specific surface on the order of 100 to 130 m²/g after calcining at a temperature of 400° C. to 450° C.

After calcination, the ceric oxide is recovered in very good yield since, when expressed as cerium (IV), it represents 85% to 95% of the cerium (IV) present in the initial solution of the cerium (IV) salt.

It will also be appreciated that the process of the invention is extremely well adopted to be carried out continuously.

The process of the invention can be carried out in conventional apparatus. The step of precipitation of the ceric oxide hydrate is carried out in a reactor equipped with a thermo-regulated heating device, customary reaction control means (thermometer), agitating means (anchor or propeller agitation), and means for the introduction of the reagents.

The filtration of the resultant suspension can then be effected on a filter under the pressure of an inert gas such as nitrogen, on a filter under reduced pressure (Büchner, Nutche), or else on a continuous filtration device, for example, a rotary filter of the Vernay type or a band filter.

The precipitate is then placed in silica, porcelain or alumina boats and is then subjected to the drying operation which may be carried out in any drying device, for example, in a stove which is either vented or maintained under reduced pressure.

It is then subjected to calcination, for example, in a chamber furnace, tunnel, muffle oven or rotary furnace provided with means enabling regulation of the temperature during the heat treatment.

The uses to which the ceric oxide prepared in accordance with the invention can be put are very numerous. Mention may be made, in particular, of applications as filler, binder, wash coat, thickener, dispersant, reinforcer, pigment, adsorbent and raw material for the manufacture of ceramics and of glass polishing compositions.

The ceric oxide of the invention has an unexpectedly great surface, such that it is eminently well suited for use in the field of catalysis, either as catalyst, per se, or catalyst support.

In view of the fact that said specific surface changes but slightly under the effect of a sudden increase in temperature, this assures a long useful life for the catalyst.

The ceric oxide particulates of the invention may be employed as catalyst or catalyst support to carry out a wide variety of reactions such as, for example, dehydration, hydrosulfuration, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, the treatment of exhaust gases from internal combustion engines, demetallization, methanation, and shift conversion.

Too, the ceric oxide of the invention can be used either alone or in admixture with a wide variety of other oxides.

Due to its great chemical reactivity, it can also be advantageously used for the production of mixed catalyst supports, for example, $Al_2O_3$-$MgO$-$CeO_2$ (see published Japanese Patent Application No. 78/40,077).

In order to further illustrate the present invention and the advantages thereof, the following specific examples are given, it being understood that same are intended only as illustrative and in nowise limitative.

EXAMPLE 1

Into a 6-liter three-neck round-bottom flask provided with a thermometer, an agitator, reactant inlet means (metering pump) and a reflux condenser, and equipped with a heating device, there were introduced 4265 cc of water purified by ion-exchange, the water then being raised in temperature to the boiling point thereof.

2735 mm of a solution of ceric nitrate containing 1.19 moles per liter of cerium (IV) and 0.05 moles per liter of cerium (III) were next introduced at a rate of 900 cc per hour; said solution had a free acidity equal to 0.5 N and a purity expressed as $CeO_2$ of more than 99%.

A solution was obtained which had an equivalent final concentration of cerium (IV) equal to 0.465 moles per liter.

The reaction mass was maintained under reflux for three hours.

Filtration was next carried out over fritted glass (porosity No. 3).

608 g of precipitated, hydrated cerix oxide, $CeO_2 \cdot 2H_2O$, were obtained, constituting a 90% yield of $Ce^{IV}$, expressed with reference to the $Ce^{IV}$ contained in the ceric nitrate.

Three washings with ethanol were successively carried out (in the proportion of 1000 cc of ethanol for 608 g of precipitate); the precipitate was recovered by centrifuging.

The washed precipitate was dried in an oven for 48 hours at 105° C.

The dried precipitate was placed in an alumina boat and then calcined in a muffle furnace for 6 hours at 450° C.

The product ceric oxide had the following physical/chemical properties:

(1) Its purity was very good, since it contained only 0.27% by weight of adsorbed nitrate ions.

(2) The crystalline structure of the product ceric oxide was characterized by the Debye-Scherrer method in transmission: monochromatic radiation of molybdenum or copper.

The product ceric oxide was of fluorine-type structure, namely, face-centered cubic.

The parameter and intensity of the $CaF_2$ type structure were as follows:

(i) Lattice parameter: a=5.42±0.01 Å
(ii) Crystallization rate: t=68%

The lattice parameter of pure ceric oxide is 5.411 Å (JCPDS 4 0593).

It is therefore noted that the lattice parameter was slightly expanded.

(3) It had a specific surface of 105 m²/g.

(4) Its particle-size analysis evidenced a narrow particle size distribution.

A suspension was prepared of 2-3 g/l of $CeO_2$ and particle size analysis was carried out using a SEDIGRAPH 5000 D instrument.

This apparatus measured the sedimentation rate of the suspended particles and automatically gave these results in a distribution in cumulative percentages as a function of the spherical equivalent diameters (based on Stokes law).

By a very thin beam of X-rays the apparatus determined the concentration of particles retained in suspension at different levels of sedimentation, as a function of time. The logarithm of the intensity of the X-ray was electronically produced and recorded and then presented linearly in "cumulative percentages" (smaller than) on the Y axis of an XY recorder. In order to limit the time required for the analysis, the sedimentation cell was continuously in motion such that the depth of the sedimentation cell was inversely proportional to time. The movement of the cell was synchronized with the X axis of the recorder such as to directly indicate the spherical equivalent diameter corresponding to the time elapsed with a given sedimentation depth; the information as to the dimension was presented on logarithmic paper with three modules.

The cumulative percentages obtained as a function of the diameters of the aggregates were as follows:

—$d_{50}$=1.1 μm
—$d_{16}$=0.51 μm
—$d_{84}$=1.7 μm

The standard deviations $e_1$ and $e_2$ were:

$e_1$, which is the ratio of $d_{84}/d_{50}$, was equal to 1.5
$e_2$, which is the ratio of $d_{50}/d_{16}$, was equal to 2.11.

EXAMPLE 2

Example 1 was repeated, except that 740 cc of a ceric nitrate solution which contained 1.25 moles per liter of cerium (IV) and 0.04 moles per liter of cerium (III) and had a free acidity of 0.63 N were introduced into 1,155 cc of water and 105.5 cc of concentrated nitric acid (about 14.5 N) which had been heated to reflux: the free acidity of the reaction mixture was about 1 N.

The addition of said ceric nitrate solution was carried out at a rate of 246 cc per hour.

The reaction mass was maintained under reflux for three hours.

Filtration was next carried out, resulting in a recovery of 33 g of hydrated ceric oxide, representing a yield of $Ce^{IV}$ of 17%.

The washings and the drying were carried out exactly as in Example 1.

The resultant precipitate was calcined for six hours at 400° C.

A ceric oxide having a specific surface of 105 m²/g was obtained.

EXAMPLES 3 TO 10

This series of examples demonstrated the influence of the calcining temperature on the specific surface of the product ceric oxide.

Each test was carried out in accordance with the procedure of Example 2, but in each case the temperature of calcination was varied.

The results obtained are reported in the Table which follows:

TABLE

| Example | 3 | 4 | 5 | 2 | 6 | 7 | 8 | 9 | 10 |
|---|---|---|---|---|---|---|---|---|---|
| Calcining temperature (°C.) | 250 | 300 | 350 | 400 | 450 | 500 | 600 | 700 | 800 |
| Specific surface of CeO$_2$ (m$^2$/g) | 50 | 90 | 105 | 110 | 105 | 105 | 90 | 50 | 10 |

It will be noted that the greatest specific surface was obtained upon calcining the hydrated ceric oxide at a temperature of about 400° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of ceric oxide particulates having a B.E.T. specific surface of at least $85\pm5$ m$^2$/g, measured at a temperature ranging from 350° C. to 450° C., comprising hydrolyzing an aqueous solution of a cerium (IV) salt in a nitric acid medium, filtering the precipitate of hydrolysis which results, washing in an organic solvent and optionally drying said precipitate, and thence calcining same.

2. The process as defined by claim 1, said aqueous solution of a cerium (IV) salt comprising an aqueous solution of ceric nitrate or an aqueous solution of ammonium ceric nitrate.

3. The process as defined by claim 1, wherein the concentration of cerium salt in said solution, expressed as cerium (IV), ranges from 0.3 to 2 moles per liter.

4. The process as defined by claim 1, said medium of hydrolysis comprising distilled or de-ionized water.

5. The process as defined by claim 1, said medium of hydrolysis having an acidity ranging from $10^{-2}$ to 1.0 N.

6. The process as defined by claim 5, said acidity emanating from the commencement of hydrolysis.

7. The process as defined by claim 5, said acidity emanating by nitric acid addition to the medium of hydrolysis.

8. The process as defined by claim 5, said acidity emanating by addition of a ceric nitrate.

9. The process as defined by claim 8, said ceric nitrate solution added having an acidity of from 0.3 N to 1 N.

10. The process as defined by claim 1, wherein the amount of the aqueous solution of cerium (IV) salt and the medium of hydrolysis is such that the equivalent final concentration of cerium (IV) therein ranges from 0.2 to 0.8 mole per liter.

11. The process as defined by claim 1, wherein the temperature of the hydrolysis reaction medium ranges from about 70° C. to 100° C.

12. The process as defined by claim 1, wherein the temperature of the hydrolysis reaction medium is its reflux temperature.

13. The process as defined by claim 11, wherein the temperature of the hydrolysis reaction medium is maintained for from 1 to 24 hours following addition of the solution of the cerium (IV) salt.

14. The process as defined by claim 1, said precipitate being washed at least once with an organic solvent.

15. The process as defined by claim 14, said organic solvent comprising ethanol or isopropanol.

16. The process as defined by claim 1, said calcining being carried out at a temperature of from 300° C. to 600° C. for a period of time of about 30 minutes to ten hours.

17. The process as defined by claim 16, said calcining temperature ranging from 350° C. to 450° C.

* * * * *